United States Patent
Rosenberg et al.

(10) Patent No.: US 6,555,077 B1
(45) Date of Patent: Apr. 29, 2003

(54) ORGANIC IMPURITY REMOVAL PROCESS FOR BAYER LIQUORS

(75) Inventors: Steven Philip Rosenberg, Australind (AU); Wayne Tichbon, Eaton (AU); Steven James Healy, Bunbury (AU)

(73) Assignee: Worsley Alumina Pty. Ltd (AU)

( * ) Notice: Subject to any disclaimer, the term of this patent is extended or adjusted under 35 U.S.C. 154(b) by 0 days.

(21) Appl. No.: 09/763,140

(22) PCT Filed: Aug. 20, 1999

(86) PCT No.: PCT/AU99/00672

§ 371 (c)(1),
(2), (4) Date: Feb. 20, 2001

(87) PCT Pub. No.: WO00/10918

PCT Pub. Date: Mar. 2, 2000

(30) Foreign Application Priority Data

Aug. 20, 1998 (AU) .............................. PP5365

(51) Int. Cl.[7] .............................. C01F 7/46; C01F 7/30
(52) U.S. Cl. ....................................... 423/121; 423/130
(58) Field of Search .................. 423/122, 121, 423/130

(56) References Cited

U.S. PATENT DOCUMENTS

| | | | |
|---|---|---|---|
| 4,280,987 A | * | 7/1981 | Yamada et al. ............. 423/119 |
| 4,663,133 A | * | 5/1987 | Malito et al. ............... 423/121 |
| 4,668,486 A | | 5/1987 | Brown et al. ............... 423/130 |
| 5,728,180 A | | 3/1998 | Williams et al. .......... 23/305 A |

FOREIGN PATENT DOCUMENTS

| | | |
|---|---|---|
| AU | 52626/79 | 5/1980 |
| AU | B 27000/92 | 4/1993 |
| AU | 20347/95 | 2/1996 |
| WO | WO 85/05095 | 11/1985 |

* cited by examiner

*Primary Examiner*—Steven Bos
*Assistant Examiner*—Anthony Kuhar

(57) ABSTRACT

A process for the removal of organic impurities in a Bayer process liquor in which wet and dry oxidation processes are linked together in a complementary way, such that the weaknesses of each individual organic removal process become a strength of the combined process. An organics-rich liquor stream is fed to a wet oxidation process to produce a first processed liquor which is depleted in organic compounds, but enriched in sodium carbonate and/or sodium oxalate. A feed slurry is fed to the dry oxidation process, typically including a liquor burner, where sodium compounds react to produce a discharge product. The first processed liquor and discharge product are directed into a leach tank, resulting in the formation of precipitated products including sodium carbonate and/or sodium oxalate. The precipitated products are separated from the leach tank and recycled in a mix tank providing the feed slurry to the liquor burner.

10 Claims, 2 Drawing Sheets

ORGANIC IMPURITY REMOVAL PROCESS FOR BAYER LIQUORS

FIELD OF THE INVENTION

The present invention relates to a process for the removal of organic impurities in a Bayer process liquor.

BACKGROUND TO THE INVENTION

The accumulation of organic impurities in Bayer process liquors is a problem faced by most alumina refineries. The bulk of these impurities enter as contaminants within the bauxite, although a small proportion enters the liquor stream as a result of process additives such as flocculants and antifoams. Because Bayer liquors are highly caustic most of the organic compounds hydrolyse and are therefore present as their sodium salts. Caustic-insoluble organics generally depart with the mud residue and play no further part in the Bayer process. Apart from the direct deleterious effects of these organic species on the alumina refinery's productivity and product quality, a proportion decomposes to form sodium carbonate and sodium oxalate. These latter contaminants create a variety of problems in their own right, including caustic consumption, reduced yield and degraded product quality. Consequently, most refineries already operate processes to control the levels of sodium carbonate (by causticisation with slaked lime) and oxalate. However, far fewer refineries practice organic impurity removal, and the major reason for this is that existing organic removal processes are either complicated, expensive, or form side-products that are almost as problematical as the organics themselves.

Most organic removal processes operate via some variation on the principal of oxidative destruction of the organics. These processes can be performed either in the solid phase (calcination or liquor burning technologies) or in the aqueous phase ("wet oxidation" technology, in which the oxidation is effected either by chemical or electrical means). Both the "solid" (dry) and "liquid" (wet) phase processes suffer some serious disadvantages, which will be discussed below. Other organic removal processes such as the use of liquid anion exchange resins, ultrafiltration, or adsorbent materials such as magnesite, are of no interest in the present application, and will not be considered.

Two of the more commonly used dry organic destruction processes include liquor burning and salting-out evaporation. In the former process, liquor is evaporated to dryness in contact with gibbsite or alumina to form pellets which are then calcined. The oxidation products, along with the sodium carbonate and sodium hydroxide in the liquor react with the alumina to form sodium aluminate, which is subsequently dissolved and returned to the process. Thus, the process "causticises" the organics, recovering the valuable soda. Unfortunately, the process is complicated and energy-inefficient, most of the energy being consumed in evaporating the water from the feed liquors.

The process of salting-out evaporation is similar. In this case, a liquor stream is deeply evaporated, resulting in the "salting-out" of impurities, such as organic sodium salts, sodium oxalate, sodium carbonate and sodium sulphate. The solid impurities are separated from the supernatant liquor by filtration or centrifugation. The filtrate or centrate is returned to the process, while the solids are either disposed directly (resulting in a substantial loss of soda values), reacted with lime to causticise the sodium carbonate component, or mixed with bauxite and fed to a kiln. In the kiln, the carbonate, oxalate and organic species react with the bauxite to form mainly sodium aluminate and sodium ferrate. The kiln products are then reslurried and directed either to the digestion circuit, or the clarification circuit of the Bayer process. The salted-out solids are often very viscous and poorly crystalline, and can be difficult to separate from the supernatant liquor. Like liquor burning, the process is also very energy-inefficient requiring the evaporation of large quantities of water.

Wet oxidation processes involve reaction of the organic species with an oxidising agent, such as oxygen, ozone, chlorine or manganese dioxide. Contamination of the liquor stream, toxicity and reagent costs are prohibitive with most reagents other than oxygen. Oxidation using oxygen or ozone can be effective and economical, but requires operation at elevated temperatures and pressures for maximum efficiency. Safety is a serious concern with this process, as dangerous levels of hydrogen can be evolved in these high temperature processes. Electrolytic processes have been investigated at a laboratory level, but remain untried on a pilot or plant scale.

All of the wet oxidation processes suffer from a serious disadvantage in that they produce large quantities of sodium carbonate, and in most cases, sodium oxalate. This places considerable strain upon the refinery's existing carbonate and oxalate removal facilities. In practice, this will usually necessitate the construction of additional causticisation and oxalate removal capacity, together with increased consumption of reagents such as lime.

SUMMARY OF THE INVENTION

The present invention was developed with a view to providing an improved organic removal process in which wet and dry organic removal processes are combined in a complementary manner such that the weaknesses of each individual process become a strength of the combined process.

According to one aspect of the present invention there is provided a process for the removal of organic impurities from a Bayer process liquor, the process including the steps of:

feeding a Bayer liquor stream rich with organic impurities to a wet oxidation process to produce a first processed liquor which is depleted in organic compounds, but enriched with sodium carbonate and/or sodium oxalate;

reacting a substantial component of the sodium compounds in a feed slurry using a dry oxidation process to produce a processed discharge product, feeding at least a portion of the first processed liquor to a leach tank liquor to which is added the processed discharge product from the dry oxidation process, wherein the sodium carbonate and/or sodium oxalate precipitate in the leach tank liquor; and, separating the precipitated sodium carbonate and/or sodium oxalate from the leach tank liquor and recycling the precipitated products in the feed slurry to the dry oxidation process;

whereby, in use, organic impurities in the Bayer liquor stream and residual organic impurities remaining in the first processed liquor or in the recycled precipitated products, are causticised to sodium aluminate or sodium ferrate in the dry oxidation process.

Preferably, substantially all of the Bayer liquor stream is fed to the wet oxidation process first and the balance (if any) of the first processed liquor (that which is not fed to the leach tank liquor), is fed to the dry oxidation process.

Typically said balance of the first processed liquor and the recycled precipitated products are fed to a mix tank for the dry oxidation process.

Typically the dry oxidation process employs a liquor burner. Optionally the wet oxidation process also employs an evaporator. Advantageously the process of the present invention is combined with a sulphate removal process which is the subject of Australian patent No. 673306, the contents of which are incorporated herein by reference.

In such an arrangement, a proportion of the processed discharge product from the dry oxidation process is fed to a second leach tank liquor having a caustic concentration sufficient to ensure the solubility of gibbsite is not exceeded, and wherein the feed of said processed discharge product to the second leach tank liquor is regulated to ensure that the amount of sodium sulphate in said processed discharge product is substantially equal to the total input of sulphate to the process.

BRIEF DESCRIPTION OF THE DRAWINGS

In order to facilitate a more comprehensive understanding of the nature of the invention, preferred embodiments of the process for the removal of organic impurities will now be described in detail, by way of example only, with reference to the accompanying drawings, in which.

DETAILED DESCRIPTION OF PREFERRED EMBODIMENTS

The present invention is based on the discovery that wet and dry oxidation processes may be linked together in a complementary way, such that the weaknesses of each individual organic removal process become a strength of the combined process. Typically the total organic removal capacity of the combination is only slightly less than the sum of the individual processes, but with substantially reduced energy consumption and no undesirable by-products. The combined system may alternatively be viewed as a means of substantially increasing the organics destruction capacity of the liquor burner, without requiring enlargement of the liquor burning plant.

Figure 1:
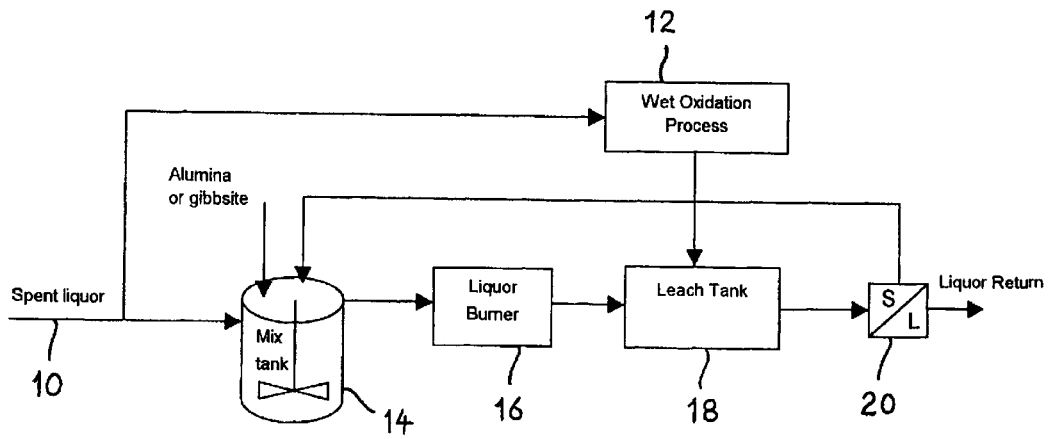
FIG. 1 is a simplified conceptual flow diagram illustrating the principle of a preferred process in accordance with the invention.

The basic concept of a preferred process in accordance with the invention is illustrated in the flow diagram of FIG. 1. In the preferred process, an organics-rich liquor stream 10, such as a spent Bayer liquor, is fed to both a wet oxidation process 12 and to the feed tank 14 of a dry oxidation process 16. Throughout the present specification, a liquor burner 16 is used as the dry oxidation process, but any process which reacts sodium compounds with aluminium or iron oxides or hydroxides to produce solid sodium aluminate or sodium ferrates can be applied. A liquor burning process is the subject of U.S. Pat. No. 4,280,987 by Yamada et al, which corresponds to Australian Patent No. 523,504. A refinement of the process is the subject of Australian patent application No. 70264/91. Any suitable wet oxidation process may be employed, for example, the process described in GB2,037,722. The contents of these prior art patent specifications are incorporated herein by reference.

As shown in FIG. 1, some of the organics-rich liquor stream is oxidised within the wet oxidation process 12 to produce a first processed liquor which is depleted in organic sodium compounds, particularly humic substances, but enriched with sodium carbonate and/or sodium oxalate. This wet-oxidised processed liquor is directed to a leach tank 18 immediately following the liquor burner 16.

In the process of FIG. 1, some of the organics-rich liquor stream is fed to the feed (mix) tank 14 for the liquor burner 16. A substantial component of the organic impurities in the Bayer liquor stream is removed in the liquor burner 16 and the liquor burner kiln discharge product is directed into the leach tank 18, where it dissolves in the processed liquor from the wet oxidation process 12. The resultant increase in the leach tank solution's ionic strength causes the sodium carbonate and sodium oxalate to become supersaturated, so that they precipitate from the leach tank liquor. Although the target concentration of the liquor in the leach tank 18 is limited only by the solubility of sodium aluminate, in practice best performance is obtained from caustic ('C') concentrations in the range of 200–600 g/l. The low humate content, and high carbonate and oxalate content of the wet-oxidised processed liquor contribute to the formation of a precipitate that is easily separable from the supernatant liquor using a filter or centrifuge 20.

After solid/liquid separation, the precipitated solids are recycled to the mix tank 14 as feed to the liquor burner 16. The concentrated supernatant liquor is returned to the Bayer process. In the mix tank 14, the recycled sodium carbonate and sodium oxalate are reslurried in a minimal amount of spent liquor along with enough gibbsite or alumina to ensure full causticisation in the liquor burner 16. As the feed to the liquor burner 16 is a dense slurry, no additional evaporation is required. Organics in the spent liquor, the recycled solids and any residual organics or sodium carbonate remaining in the wet oxidised processed liquor adhering to the recycled precipitated solids, enter the liquor burner 16 and are causticised to sodium aluminate.

EXAMPLE 1

The benefits of the proposed system are illustrated in the following example. The performance of a typical conventional liquor burner capable of processing 36 m$^3$/hr of LTD (liquor to digestion) is shown in Table 1. This may be compared with the performance of the proposed combined system (Table 2), in which the same liquor burner is linked with a wet oxidation system operating at 175° C. and an oxygen partial pressure of 4 atmospheres. The LTD has an organic carbon content of 20 g/L.

TABLE 1

| Estimate of TOC destruction performance of conventional Liquor Burner | |
|---|---|
| LTD flow to Liquor Burner | 36 m$^3$/hr |
| LTD flow to leach tank | 322 m$^3$/hr |
| Total LTD Flow | 358 m$^3$/hr |
| Total TOC input | 7.2 t/hr |
| TOC destroyed by Liquor Burner | 0.72 t/hr |
| % TOC destroyed | 10.0% |

TABLE 2

Estimate of TOC destruction performance of Combined System

| | |
|---|---|
| LTD flow to Liquor Burner | 5 m³/hr |
| LTD flow to Wet Oxidiser | 353 m³/hr |
| Total LTD Flow | 358 m³/hr |
| Total TOC input | 7.2 t/hr |
| TOC destroyed by combined system | 1.44 t/hr |
| % TOC destroyed | 20.0% |
| % Improvement in TOC removal relative to Liquor Burner only | 100% |

It can be seen that the combined system is capable of destroying and fully causticising twice the amount of TOC as the liquor burner alone. However, the performance improvement offered by the disclosed process is not limited to the example shown above, and both higher and lower conversion efficiencies can be achieved depending upon the configuration and size of the wet oxidation and liquor burning units. Ideally, the flow of liquor to the wet oxidation unit is sized such that the amount of sodium carbonate and sodium oxalate solids that precipitate in the leach tank precisely matches the input requirements of the liquor burning unit, with no excess. However, smaller wet oxidation units can be used (with correspondingly smaller improvements in TOC removal capacity), simply by adjusting the direct feed of LTD to the liquor burner.

The operation of the leach tank may be critical to the performance of the process. If the caustic concentration of the leach tank is too high, entrainment of liquor within the precipitated solids cake becomes significant. This entrained liquor, being of high concentration, results in the recycle of excessive amounts of sodium aluminate and sodium hydroxide to the liquor burner, reducing efficiency. On the other hand, too low a concentration may result in too little sodium carbonate and sodium oxalate precipitating. The exact concentration at which to operate the leach tank will depend upon many factors including the configuration of the wet oxidation and liquor burning units, and the composition of the feed (LTD) liquor. A balance is sought between the dissolution of the sodium aluminate in the leach liquor and the precipitation of sodium carbonate, sodium oxalate and any organic sodium salts which may also precipitate, such that the amount of sodium salts precipitated matches the requirements of the liquor burner or salting-out kiln. Furthermore, in most instances, sodium sulphate precipitation must also be minimised, unless specific steps are taken for its simultaneous removal. In most instances, however, best performance will be obtained at a 'C' concentration in the leach tank of approximately 300 g/L.

EXAMPLE 2

Figure 2:
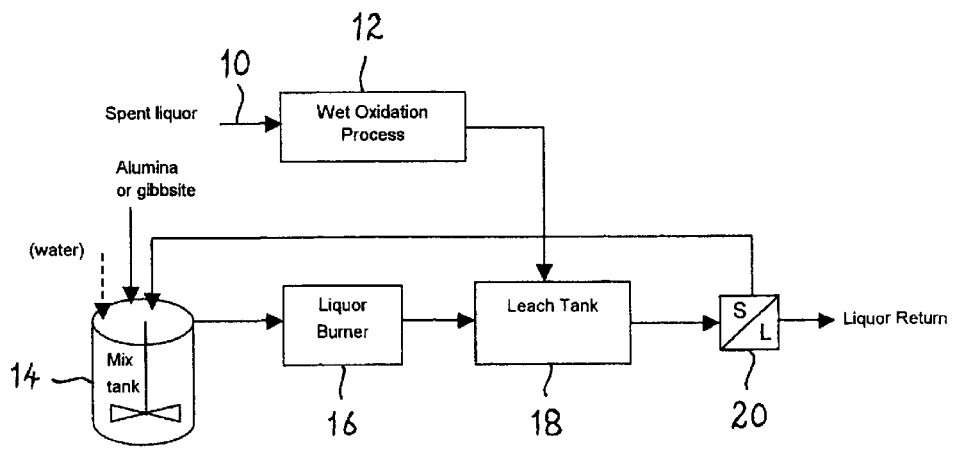
FIG. 2 is a conceptual flow diagram illustrating a variation of the process of FIG. 1, and, FIG. 3 is a conceptual flow diagram illustrating a preferred embodiment of the process for the removal of organic impurities from a Bayer process liquor in accordance with the invention.

FIG. 2 illustrates a variation of the process of FIG. 1, in which the like parts have been identified with the same reference numerals. This modified process requires a larger wet oxidation facility to achieve a similar organic removal capacity but reduces the emission of volatile organic carbon (VOC) compounds from the liquor burner 16. The process varies from the basic concept illustrated in FIG. 1, in that all of the organics-rich spent liquor 10 is fed to the wet oxidation process 12, and then the processed liquor from the wet oxidation process 12 is used to feed the leach tank 18. There is no direct flow of liquor to the mix tank 14 of the liquor burner 16. In this way, the input to the liquor burner 16 is greatly reduced in organic content, as most has been converted to sodium carbonate and sodium oxalate. The reduction in organic carbon to the liquor burner 16, especially of humic materials, can result in substantial improvements in the odour and VOC content of the liquor burner's stack gas emissions. No change in the size of the liquor burning unit is required.

The direct flow of liquor to the mix tank 14 has been omitted because the filtered solids from the leach tank 18 generally contain sufficient entrained liquor to ensure good pellet formation within the liquor burner's drying and pelletising unit. Consequently, the cake, together with the appropriate amount of alumina or gibbsite, can be dispersed in the mixing tank 14 with just sufficient water (if required) to produce a uniform paste. Removing the direct feed of liquor to the liquor burner 16 improves the TOC removal capacity of the process by minimising the unproductive input of sodium aluminate and sodium hydroxide.

In both of the configurations illustrated in FIGS. 1 and 2, additional capacity can be achieved by incorporating a suitable evaporator prior to the wet oxidation process 12. This will provide the wet oxidation unit with a stream that is enriched with organics, enhancing performance. Deep evaporators such as those used in the prior art liquor burning or salting-out evaporation processes are not required. Indeed, any one of the refinery's existing evaporators would be suitable for the purpose. In this instance, heat from the wet oxidation process can be recovered for use by the evaporator.

EXAMPLE 3

A disadvantage of the two preceding configurations arises when the Bayer process stream contains high concentrations of sodium sulphate. Sodium sulphate does not react with alumina in the liquor burner, and passes through the system intact. Owing to its comparatively low solubility, it will precipitate in the leach tank and will thus recycle with the other precipitates. The recirculating load will quickly rise to unacceptable levels, and the process will fail to operate. This disadvantage is overcome in the preferred embodiment of the process illustrated in FIG. 3.

Figure 3:
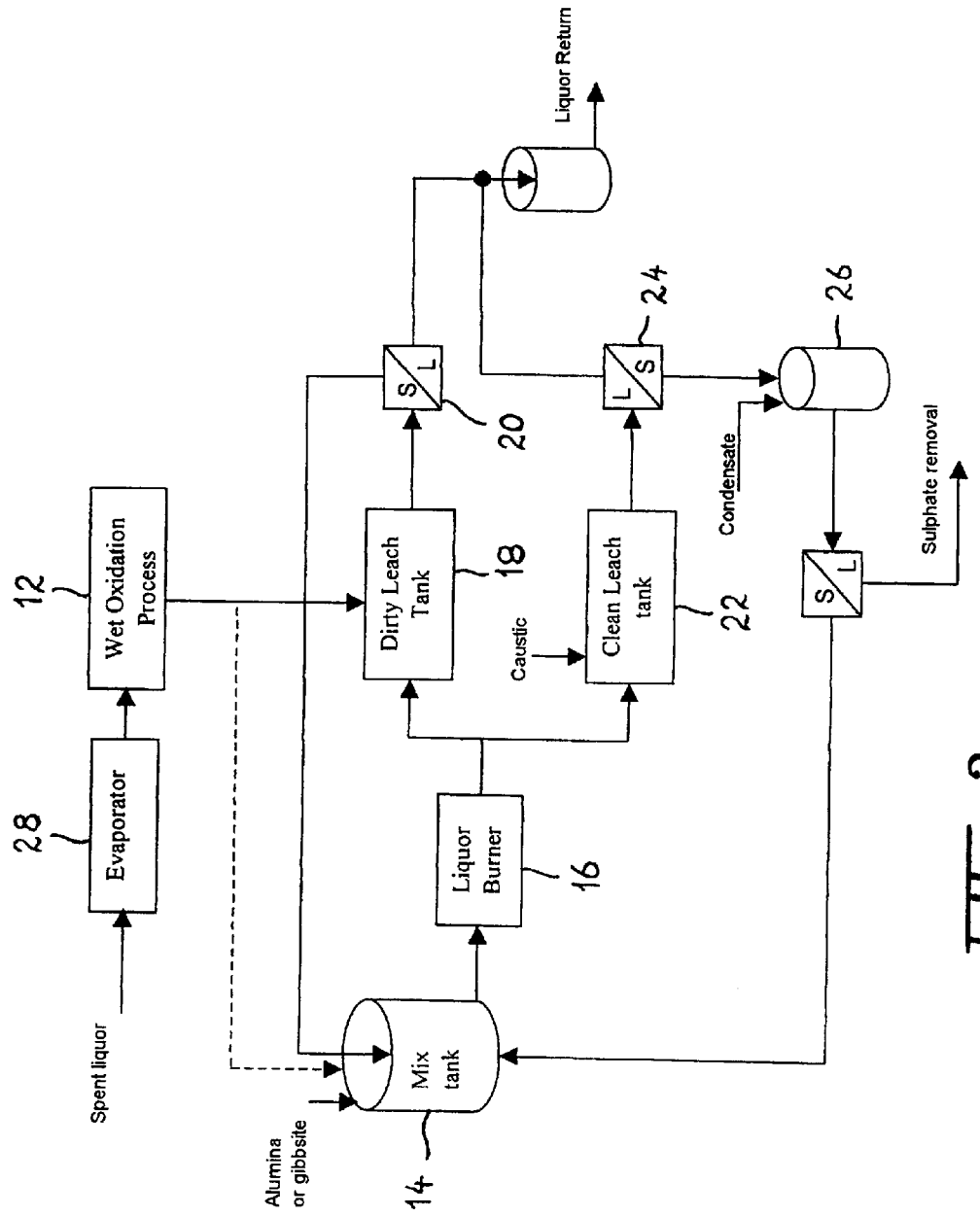

The preferred embodiment of the process for removal of organic impurities from a Bayer process liquor as illustrated in FIG. 3 is similar to that of FIG. 2, except that it is combined with the sulphate removal process disclosed in commonly-owned Australian Patent No. 673306. The disclosure of Australian Patent No. 673306 is incorporated herein by reference. Once again, the like parts in the process of FIG. 3 have been identified with the same reference numerals as in FIGS. 1 and 2. An optional evaporator 28 has been incorporated prior to the wet oxidation unit 12. The process of the invention as embodied in FIG. 3 may be combined with the sulphate removal process of 673306 by the addition of an additional leach tank 22 and solid/liquid separation unit 24. A splitter is used to direct a proportion of the processed discharge product from the liquor burner 16 into a "dirty" leach tank 18, which is fed with processed liquor from the wet oxidation process 12. Solids precipitating from this tank 18 are recycled to the liquor burner mix tank 14, as in the preceding embodiments.

The remaining portion of the liquor burner kiln discharge product is directed into a "clean" leach tank 22 fed with a caustic solution of sufficient concentration to ensure that the solubility of gibbsite is not exceeded. Alternatively, a suitable process liquor stream can be used. The feed of the processed discharge product from the liquor burner 16 to the leach tank 22 is controlled such that the amount of sodium sulphate in the discharge product is equal to the total input of sulphate to the process. The high caustic and low carbonate concentration of the liquor in the "clean" leach tank 22 ensures that only sodium sulphate is precipitated. The slurry from tank 22 is filtered in the solid/liquid separation unit 24, and the solids leached in water in leach tank 26. The resultant sodium sulphate solution is then disposed of or purified, as in Australian Patent No. 673306, and the remaining alumina solids are recycled to the liquor burner mix tank 14.

TEST RESULTS

Typical unit operations of the proposed process were simulated individually in the laboratory. Products from each of these operations were then passed on to the next operation in the sequence, such that a full model simulation of the process was finally obtained. For comparison, the operation of a conventional liquor burning unit was also simulated. Results reported here are based on this comparison.

Wet Oxidation

Spent liquor (LTD) from a Western Australian refinery was used as the feedstock throughout the test programme. This liquor is typical of many alumina refineries. Five litres of this liquor was added to a 17 litre autoclave (Parr Instrument Company, Illinois, USA), and oxygen added to achieve a partial pressure of 20 atmospheres. The mixture was then heated to 175° C. without agitation. Once at temperature, agitation was commenced, using twin pitch-blade turbine impellors operating at 700 rpm, for a period of 30 minutes. The reaction temperature was maintained at 175° C. through a combination of the reactor's heating elements and a serpentine cooling coil. After 30 minutes had elapsed, the mixture was rapidly cooled to 85° C. using the cooling coil and the resultant slurry filtered through a Supor membrane (0.45 μm) filter. The solids were dried at 105° C.

While a higher temperature will increase the efficiency and capacity of the process, 175° C. was chosen primarily because very little hydrogen is evolved at this temperature (<0.3% in the off-gases). In addition, this temperature is easily accessible even in low temperature alumina refineries: the process can be fed from the heater side of one of the refinery's existing evaporators, with additional temperature rise provided by the exothermic reaction of the organics. A typical analysis of the liquor before and after the wet oxidation procedure is shown in Table 3 below.

TABLE 3

Typical Results of Wet Oxidation Procedure

| Liquor | A g/L | C g/L | S g/L | A/C | C/S | $Na_2CO_3$ g/L | $Na_2C_2O_4$ g/L | TOC g/L | Density g/mL |
|---|---|---|---|---|---|---|---|---|---|
| Untreated LTD | 105.4 | 234.2 | 292.7 | 0.45 | 0.800 | 58.5 | 4.3 | 27.4 | 1.365 |
| Wet Oxidised LTD | 104.7 | 206.5 | 289.0 | 0.507 | 0.714 | 82.53 | 4.87 | 23.0 | 1.363 |

Leach Tank

Approximately 8500 mL of wet oxidised liquor (collected from two wet oxidation runs) was transferred to an agitated stainless steel vessel, heated to 95° C. A proportionate amount of the solids that precipitated as a result of the wet oxidation procedure were added to this liquid, together with 1350 g of pure sodium aluminate (Sumitomo Chemical, Japan). This latter material was intended to simulate the addition of kiln product. The amount of sodium aluminate was determined by the target 'C' concentration in the leach tank of 300 g/L. After addition of these solids, the mixture was permitted to equilibrate for 60 minutes, before filtration. This filtration was performed at 95° C. and under a pressure of 400 kPa. These conditions were selected so as to minimise entrained liquor in the filter cake. Analyses of the liquid and solids obtained from this process are shown in Tables 4 and 5 respectively. Solids analyses were performed by a combination of dry (XRF) and wet (TOC, TIC) analytical techniques on samples that had been dried to constant weight. TIC refers to the total inorganic carbon content.

TABLE 4

Typical Liquor Analysis After Leaching and Precipitation

| A g/L | C g/L | S g/L | A/C | C/S | $Na_2CO_3$ g/L | $Na_2C_2O_4$ g/L | TOC g/L | Density g/mL |
|---|---|---|---|---|---|---|---|---|
| 189.2 | 312.5 | 381.5 | 0.606 | 0.819 | 69.0 | 2.9 | 22.4 | 1.443 |

TABLE 5

Typical Analysis of Precipitated Solids

| $Na_2O$ % | $Al_2O_3$ % | $SO_3$ % | NaCl % | LOI % | TIC % | TOC % | Total % |
|---|---|---|---|---|---|---|---|
| 49.7 | 10.4 | 22.1 | 0.8 | 12.1 | 3.6 | 2.5 | 101.2 |

Pelletiser (Paddle Mixer)

The wet cake was mixed with gibbsite from a Western Australian refinery and additional water added, to form a thick slurry. The ratio of gibbsite to wet oxidised solids was chosen to give a molar ratio of $Al_2O_3$ to $Na_2O$ of approximately 1:1. This slurry was charged into a custom made cylindrical stainless steel pelletiser (length 610 mm, diameter 220 mm). The pelletiser, equipped with a stainless steel rod (19 mm diameter) and an internal thermocouple, was kept under partial vacuum and rotated at 25 rpm inside a muffle furnace, the inside temperature being kept at 150–170° C. Pelletisation was considered complete when no further water was released from the solids.

A similar procedure was followed to simulate pellet formation for a conventional liquor burner, using untreated LTD. Typical analyses for the pellets produced for both the proposed process and for a conventional liquor burner are shown in Table 6.

TABLE 6

Typical analysis of simulated pelletiser product

| | $Na_2O$ % | $Al_2O_3$ % | $SO_3$ % | NaCl % | LOI % | TIC % | TOC % | Total % |
|---|---|---|---|---|---|---|---|---|
| New Process | 28.5 | 36.9 | 9.5 | 0.8 | 23.3 | 1.6 | 1.5 | 102.2 |
| Liquor Burner | 28.4 | 42.4 | 3.3 | 2.4 | 24.6 | 0.8 | 2.4 | 104.5 |

Dryer and Kiln

The effect of the preferred process on volatile organic carbon (VOC) emissions was examined using pellets prepared in the previous step. The conditions that result in the evolution of VOC's in a liquor burner's drying circuit and kiln were simulated in the laboratory using a muse furnace operating at 950° C., through which dry clean compressed air was flowed at a rate of 10 normal litres per minute. Approximately 20 g of pellets from either the improved process or conventional liquor burner was weighed into a vitreous silica crucible and the crucible placed in the preheated oven. Air passing through the oven was sampled at a rate of 4 normal litres per minute.

The sampled air was passed through a two-stage trap to collect evolved VOC's. The first trap consisted of a stainless steel coil cooled to 0° C. and a Dreschel bottle cooled to −12° C. within which water and water-soluble organics were collected. The second trap consisted of a stainless steel vessel filled with borosilicate glass Raschig rings, cooled with liquid nitrogen, within which the remainder of the VOC's were collected.

This evolution and sampling procedure was repeated until 87.33 g of each of the pellet types had been processed and the evolved organics collected.

Analysis of the collected organics was performed by solid phase micro-extraction of the headspace above the relevant samples followed by GC/MS analysis. Comparison of the total evolved organics was carried out on the basis of the total integrated peak areas. While these measurements do not directly give the total mass of VOC's evolved, it permits a simple comparison of the VOC emissions from the improved process relative to the conventional liquor burning process. Typical results are shown in Table 7, in which the integrated peak areas have been normalised against that of the conventional or burning process.

TABLE 7

Relative VOC emissions

| Process | Normalised Integrated Peak Area |
| --- | --- |
| New Process | 11.75% |
| Conventional Liquor Burner | 100.0% |

It can be seen from Table 7 that in this example the use of the improved process has resulted in an approximate 9-fold reduction in VOC emissions relative to the conventional liquor burning process. The extent of the improvement in VOC emissions achieved in practice will be dependent upon the configuration of the wet oxidation and liquor burning units, and the concentration and character of the organics within the feed liquor.

Chromatograms for VOC's collected from the Improved Process were considerably simpler (far fewer peaks) than those of the conventional liquor burner. Identification of some of the more abundant components of the evolved VOC's was performed using selective ion mass spectrometry. Typical results are shown in Table 8.

TABLE 8

Comparison of specific evolved VOC's

| | % of total VOC's | | % of total VOC's multiplied by normalised peak area | |
| --- | --- | --- | --- | --- |
| Species | Improved Process | Conventional Liquor Burner | Improved Process | Conventional Liquor Burner |
| Benzene | 0 | 0.49% | 0 | 0.49% |
| Naphthalene | 7.6% | 6.9% | 0.89% | 6.9% |
| Toluene | 0 | 0.06% | 0 | 0.06% |
| 1-methyl-3-phenoxy benzene | 1.83% | 0.04% | 0.22% | 0.04% |
| Benzaldehyde | 0 | 0.23% | 0 | 0.23% |
| 1-methyl-4-nitrobenzene | 0.27% | 3.65% | 0.03% | 3.65% |
| Benzene acetonitrile | 0.11% | 0.26% | 0.01% | 0.26% |
| Biphenyl | 6.9% | 10.5% | 0.81% | 10.5% |
| Cyclohexadiene derivative | 11.6% | 3.5% | 1.4% | 3.5% |

The first set of columns in Table 8 represent the percentage of each species in the off-gases from each of the two processes. In some cases, the percentage of a particular species has increased, however, since the total mass of VOC's evolved by the improved process is substantially smaller, the evolved mass of these species is invariably lower than for a conventional liquor burner. This is shown in the second set of columns. The above results show that, along with a substantial reduction in the total amount of each species (relative to a conventional liquor burner), the nature of the organics evolved is also markedly different, with the improved process producing far less aromatic and polyaromatic compounds.

The calcined product remaining in the crucible was analyzed by a combination of dry (XRF) and wet (TOC, TIC) techniques. Typical analyses obtained for the calcined product are shown in Table 9.

TABLE 9

Analysis of Calcined Product

| | $Na_2O$ % | $Al_2O_3$ % | $SO_3$ % | NaCl % | TIC % | TOC % | Total % |
| --- | --- | --- | --- | --- | --- | --- | --- |
| New Process | 37.1 | 41.1 | 16.2 | 0.86 | 0.53 | 0.06 | 95.9 |
| Liquor Burner | 37.4 | 52.4 | 3.85 | 2.87 | 0.22 | 0.11 | 96.9 |

Results and Comparison of Proposed Process and Prior Art

The following results and comparisons arc based on the premise that the amount of sodium aluminate produced by the liquor burner is held constant. Consequently, the results are presented on the basis of TOC destruction per kilogram of "reactive soda" entering the kiln. "Reactive soda" is defined as the sodium content of the liquor or pellets that is capable of reacting with alumina within the kiln to form sodium aluminate, expressed as sodium carbonate. Thus, sodium sulphate and sodium chloride, which do not normally react in this way, are not included as reactive soda.

In practice, this form of comparison represents the minimum improvement possible, because the reduced water input to the liquor burner afforded by the new process will permit greater throughput of solids through the kiln.

TABLE 10

Performance of Simulated Conventional Liquor Burner

| Inputs | |
|---|---|
| Liquor (LTD) in: | 3150.2 mL |
| TOC in: | 86.22 g |
| Pellets produced: | 2504 g |
| Reactive soda in pellets: | 1049.4 g |
| $NaAlO_2$ in: | 1141.6 g |
| $Al(OH)_3$ added: | 1129 g |
| Outputs | |
| $NaAlO_2$ out: | 1623.6 g |
| TOC out: | 3.95 g |
| Performance (per kg Reactive Soda) | |
| "New" $NaAlO_2$ produced: | 482.0 g |
| TOC destroyed | 78.4 g |

TABLE 11

Performance of Proposed Combined Process

| Inputs | |
|---|---|
| Liquor (LTD) in: | 7978.9 mL |
| TOC in: | 218.4 g |
| Pellets produced: | 1515.0 g |
| Reactive soda in pellets: | 353.1 g |
| $NaAlO_2$ in: | 185.9 g |
| $Al(OH)_3$ added: | 855.0 g |
| Outputs | |
| $NaAlO_2$ out: | 546.4 g |
| TOC out (liquor): | 167.9 g |
| TOC out (pellets) | 0.69 g |
| Performance (per kg Reactive Soda) | |
| "New" $NaAlO_2$ produced: | 1021.0 g |
| TOC destroyed | 141.1 g |

TABLE 12

Performance Comparison

| Parameter (per kg Reactive soda) | Conventional Liquor Burner | New Process | % improvement |
|---|---|---|---|
| TOC destruction | 78.4 g | 141.1 g | 80.0% |
| "New" $NaAlO_2$ production | 459.3 g | 1021.0 g | 122.3% |
| Percent "new" $NaAlO_2$ | 29.7% | 66.0% | |

The theoretical improvement in performance for the above laboratory test was 99%, relative to a conventional liquor burner. The improvement obtained (80%) is less than the theoretical maximum primarily because of entrained liquor in the precipitate from the leach tank. This entrained liquor reduces the capacity of the liquor burner by recycling sodium aluminate and sodium hydroxide, neither of which contributes to the TOC removal capability of the liquor burner.

The "new" $NaAlO_2$ production figure reported above refers to sodium aluminate not already contained in the feed liquor to the process (for the purpose of this calculation, sodium hydroxide is also considered as sodium aluminate). This is a measure of the causticising efficiency of the process, and like the TOC removal performance, is strongly affected by the recycle of entrained liquor with the leach tank precipitate. It should be noted that while much of the "new" $NaAlO_2$ derives from soda associated with the additional TOC destroyed, some comes from sodium carbonate already present in the feed liquor This highlights another advantage of the proposed process: the removal and causticisation of additional sodium carbonate from the refinery's liquor streams.

The effect of entrained liquor on the performance of the process is demonstrated by the results shown in Tables 13 and 14 below.

TABLE 13

Effect of Entrained Liquor on Performance of Proposed Process

| Inputs | |
|---|---|
| Liquor (LTD) in: | 7842.8 mL |
| TOC in: | 214.7 g |
| Pellets produced: | 1263 g |
| Reactive soda in pellets: | 447.7 g |
| $NaAlO_2$ in: | 298.1 g |
| $Al(OH)_3$ added: | 539.5 g |
| Outputs | |
| $NaAlO_2$ out: | 692.7 g |
| TOC out (liquor): | 164.9 g |
| TOC out (pellets) | 0.90 g |
| Performance (per kg Reactive Soda) | |
| "New" $NaAlO_2$ produced: | 881.4 g |
| TOC destroyed | 109.2 g |

TABLE 14

Performance Comparison

| Parameter (per kg Reactive soda) | Conventional Liquor Burner | New Process | % improvement |
|---|---|---|---|
| TOC destruction | 78.4 g | 109.2 g | 39.3% |
| "New" $NaAlO_2$ production | 459.3 g | 881.4 g | 91.9% |
| Percent "new" $NaAlO_2$ | 29.7% | 57.0% | |

Clearly, best performance is obtained by ensuring that the recycled precipitate from the leach tank is thoroughly deliquored. This is assisted by ensuring that the slurry being filtered is kept as hot as possible, to reduce the viscosity, and by targeting 'C' concentrations in the leach tank as low as is practicable (a suitable value is approximately 300 g/L).

From the above description of preferred embodiments of the organic impurity process for Bayer liquors, a number of advantages of the combined system will be apparent, including the following:

(i) Wet oxidation is a simple organic removal process, but it suffers from the serious disadvantage of generating sodium carbonate and sodium oxalate as reaction products. These must be either further treated or discarded. On the other hand, liquor calcination techniques such as Liquor Burning produce a product that can be directly utilised in the alumina refinery, but are very energy inefficient. Most of this energy is expended in reducing the Bayer liquor to dryness, and only a small proportion of the dissolved solids in the liquor is actively involved in the organic removal process. The proposed process overcomes both of these limitations by combining the two processes in such a way that the weakness of each individual process becomes a strength of the combined process. When combined in the manner proposed, the TOC destruction capacity of an existing liquor burner or other liquor calcination process can be increased by 80% or more.

(ii) In addition to TOC removal, the proposed process can be used to increase the causticity (C/S) of the refinery's liquor streams. This is achieved by adjusting the conditions of the leach tank so that, in addition to the products of wet oxidation, much of the sodium carbonate already present in the feed liquor is precipitated and fed to the liquor burner.

(iii) The deep evaporator commonly used to concentrate the feed stream to a liquor burner is costly in energy and prone to operating problems such as fouling. With appropriate sizing of the wet oxidation unit and leach tank, the proposed process allows the deep evaporator to be eliminated entirely.

(iv) If a deep evaporator is used, the low humate concentration of the wet oxidised liquor feeding the liquor burner will reduce the viscosity and surface tension of the liquor, improving the performance of the deep evaporator.

(v) Heat from the wet oxidation process can be recovered for use elsewhere, reducing energy consumption.

(vi) The low humate concentration of the feed to the leach tank assists in the crystallisation of solids in the leach tank (sulphate, carbonate and oxalate). The resultant leach slurry is lower in viscosity than an equivalent liquor using untreated spent liquor, improving solid/liquid separation.

(vii) By feeding the liquor burner primarily with inorganic solids, the potential for odour and VOC emissions from the liquor burner is greatly reduced. This can reduce or eliminate the need for treatment of the stack gas emissions of the liquor burner using afterburners or similar VOC destruction technology.

Numerous variations and modifications to the described process, in addition to those already described, will suggest themselves to persons skilled in the chemical engineering arts, without departing from the basic inventive concepts. For example, the process of the invention may be combined with any suitable sulphate removal process In order to control the recirculating load of sodium sulphate. All such variations and modifications are to be considered within the scope of the present invention, the nature of which is to be determined from the foregoing description and the appended claims.

The claims defining the invention are as follows:

1. A process for the removal of organic impurities from a Bayer process liquor, comprising:

feeding a first liquor stream including organic impurities to a wet oxidation process to produce a first processed liquor which is depleted in organic compounds, but enriched with sodium carbonate and/or sodium oxalate;

reacting sodium compounds with at least one of an aluminum oxide, an aluminum hydroxide, an iron oxide and an iron hydroxide in a feed slurry fed to a dry oxidation process, wherein at least part of the sodium compounds react in the dry oxidation process to produce a processed discharge product;

feeding at least a first portion of the first processed liquor to a leach tank to which is added the processed discharge product from the dry oxidation process, wherein the sodium carbonate and/or sodium oxalate precipitate in the leach tank to form precipitated products; and separating the precipitated products from the leach tank and recycling the precipitated products to form at least part of the feed slurry fed to the dry oxidation process;

wherein organic impurities in the first liquor stream and residual organic impurities remaining in the first processed liquor or in the recycled precipitated products are causticised to sodium aluminate or sodium ferrate in the dry oxidation process.

2. A process for the removal of organic impurities as defined in claim 1, wherein a second portion of the first processed liquor is mixed with the recycled precipitated products forming at least part of the feed slurry fed to the dry oxidation process.

3. A process for the removal of organic impurities as defined in claim 1, wherein all of the first processed liquor is fed to the leach tank.

4. A process for the removal of organic impurities as defined in claim 1, further comprising:

splitting a Bayer liquor stream into the first liquor stream fed to the wet oxidation process and a second liquor stream; and combining the second liquor stream with at least the recycled precipitated products to form the feed slurry.

5. A process for the removal of organic impurities as defined in claim 1, wherein the dry oxidation process employs a liquor burner.

6. A process for the removal of organic impurities as defined in claim 5, wherein the wet oxidation process includes an evaporator.

7. A process for the removal of organic impurities as defined in claim 5, further comprising:

removing sulphate from the processed discharge product.

8. A process for the removal of organic impurities as defined in claim 7, wherein a proportion of the processed discharge product from the dry oxidation process is fed to a second leach tank liquor including a caustic concentration sufficient to ensure gibbsite solubility is not exceeded, and wherein the feed of the proportion of the processed discharge product to the second leach tank liquor is regulated to ensure that an amount of sodium sulphate in the processed discharge product is substantially equal to a total input of sulphate to the process.

9. A process for the removal of organic impurities as defined in claim 8, further comprising:

ensuring that a selected caustic to soda ratio is maintained in the second leach tank liquor such that substantially only sodium sulphate is precipitated; and separating the precipitated sodium sulphate from the second leach tank liquor.

10. A process for the removal of organic impurities as defined in claim 9, further comprising:

leaching the precipitated sodium sulphate in a third leach tank liquor to form a sodium sulphate solution;

separating alumina solids from the sodium sulphate solution; and feeding the alumina solids to a mix tank, wherein the alumina solids are combined with at least the recycled precipitated products in the mix tank to form the feed slurry.

* * * * *